(12) United States Patent
Okamura

(10) Patent No.: US 7,453,438 B2
(45) Date of Patent: Nov. 18, 2008

(54) INFORMATION PROCESSING APPARATUS AND METHOD

(75) Inventor: Shuichi Okamura, Ichihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 725 days.

(21) Appl. No.: 11/080,419

(22) Filed: Mar. 16, 2005

(65) Prior Publication Data

US 2005/0212763 A1  Sep. 29, 2005

(30) Foreign Application Priority Data

Mar. 26, 2004 (JP) .............................. 2004-093164

(51) Int. Cl.
*G09G 5/00* (2006.01)

(52) U.S. Cl. ...................... 345/156; 345/173

(58) Field of Classification Search ......... 345/156–173; 715/771, 773, 778; 713/182
See application file for complete search history.

(56) References Cited

U.S. PATENT DOCUMENTS

| 5,894,307 | A | | 4/1999 | Ohno et al. |
| 6,037,882 | A | * | 3/2000 | Levy ............................. 341/20 |
| 6,130,665 | A | * | 10/2000 | Ericsson ...................... 345/173 |
| 6,965,374 | B2 | * | 11/2005 | Villet et al. .................. 345/169 |
| 7,030,890 | B1 | | 4/2006 | Jouet et al. |
| 7,337,410 | B2 | * | 2/2008 | Lin ............................. 715/773 |
| 2005/0146508 | A1 | * | 7/2005 | Kirkland et al. ............. 345/169 |
| 2007/0097085 | A1 | * | 5/2007 | Iwatsuki ...................... 345/173 |
| 2008/0150899 | A1 | * | 6/2008 | Lin ............................. 345/168 |

FOREIGN PATENT DOCUMENTS

| JP | 2003-66826 | 3/2003 |
| KR | 2002-0050785 | 6/2002 |
| WO | 01/33344 | 5/2001 |

* cited by examiner

*Primary Examiner*—Nitin Patel
(74) *Attorney, Agent, or Firm*—Fitzpatrick, Cella, Harper & Scinto

(57) ABSTRACT

An information processing apparatus and method for ensuring security when a virtual keyboard is used while an image displayed on a display is disclosed to the outside are provided. According to an embodiment of the present invention, it is determined whether or not a virtual keyboard is displayed on a display (S100). If a virtual keyboard is displayed, it is determined whether or not a target character input window onto which characters are input by using the virtual keyboard is a password input window (S101). If this window is the password input window, VRAM distribution is temporarily stopped (S102). With this operation, the distribution of the image stored in the VRAM (i.e., the image displayed on the display) is stopped while a virtual input device is displayed on the display and the target character input window is the password input window.

3 Claims, 12 Drawing Sheets

INFORMATION PROCESSING APPARATUS AND METHOD

FIELD OF THE INVENTION

The present invention relates to an information processing apparatus and method and, more particularly, to security measures to be taken when the image displayed on a display is output to an external device.

BACKGROUND OF THE INVENTION

Recently, it is possible to display the desktop frame on a given computer on another computer through a network by using software such as VNC (Virtual Network Computing: AT&T laboratories in Cambridge), Microsoft's Remote Assistance, or IBM's Desktop on Call. Many of these software applications are designed to display a desktop frame on another computer while maintaining security by requesting a password at the time of connection and performing authentication (see, for example, Japanese Patent Laid-Open No. 2003-66826).

In addition, a character input technique called a virtual keyboard, screen keyboard, or software keyboard has recently been realized. For example, a PDA or the like often does not have a keyboard as hardware because of its physical limitation, and hence a virtual keyboard having character keys arranged on it is displayed on an LCD with a touch panel. Characters are input by operating this virtual keyboard. If a virtual keyboard is displayed on the display of a general personal computer having a keyboard as hardware, desired character keys displayed on the display can be selected with a mouse. This makes it possible to input characters by only mouse operation.

In general, a selected key is, for example, highlighted on such a virtual keyboard to allow an operator to easily check whether or not a correct key is selected.

If, however, a virtual keyboard is used while the desktop frame is disclosed to the outside, the highlighted display of a selected key is also seen on an external device. If an ordinary text is seen, no problem arises. If, however, the purpose of input is to enter a password, security cannot be guaranteed.

SUMMARY OF THE INVENTION

It is an object of the present invention to provide an information processing apparatus and method which can ensure security when a virtual keyboard is used in a state wherein the image displayed on a display is disclosed to the outside.

In an aspect of the present invention, an information processing apparatus includes character input means for displaying a virtual input device on a display and inputting a character corresponding to operation on the virtual input device onto a target character input window, and output means for outputting an image displayed on the display to an external device, wherein the output means stops outputting an image displayed on the display while the virtual input device is displayed on the display and the target character input window is a password input window.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 1:
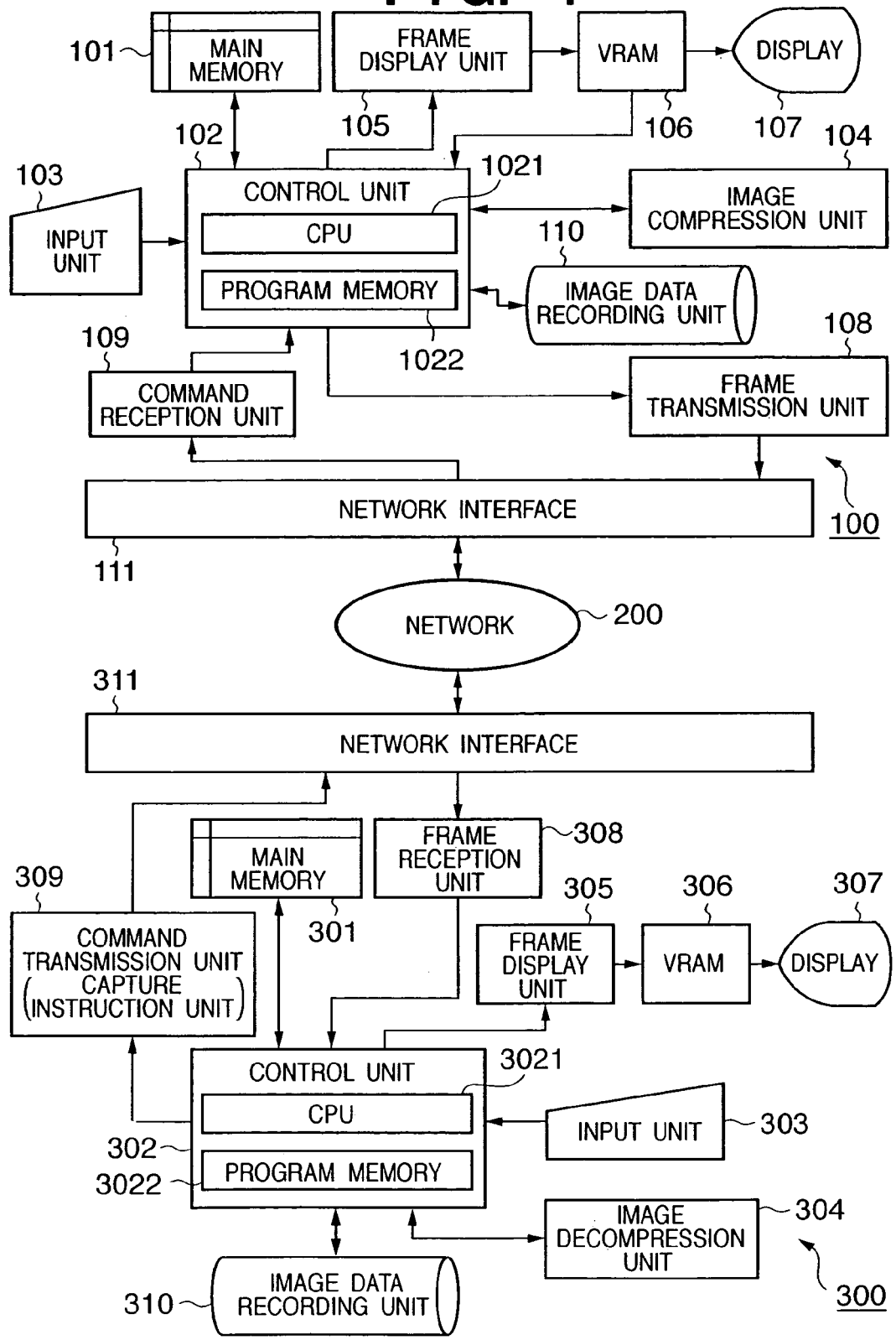
FIG. 1 is a block diagram showing an example of the arrangement of an information processing system including an information processing apparatus according to the present invention.

FIG. 1 is a block diagram showing an example of the arrangement of an information processing system including an information processing apparatus of the present invention. Referring to FIG. 1, reference numeral 100 denotes a server (on the side where the contents of a VRAM are sent out) serving as an information processing apparatus according to the present invention; and 300, a client (on the side where the contents of the VRAM of the server 100 are received). The server 100 is connected to the client 300 through a network 200.

The arrangement of the server 100 will be described first.

A main memory 101 comprises, for example, a semiconductor memory. A control unit 102 includes a CPU 1021 and a program memory 1022 which stores a program. The CPU 1021 performs overall control of the respective constituent elements in accordance with the control sequence based on the program stored in the program memory 1022.

Reference numeral 103 denotes an input unit which may operate on the assumption of input from an input device such as a keyboard or mouse, but operates, in particular in this embodiment, on the assumption of touch input from a virtual keyboard as a virtual input device appearing on the liquid crystal display with a touch panel which is integrated with an output unit.

Reference numeral 104 denotes an image compression unit which captures the contents of the VRAM and compresses an image to be distributed to a network by a frame transmission unit 108. If the image is not compressed, the image compression unit 104 is not used.

Reference numeral 105 denotes a frame display unit which forms contents to be displayed on a display 107; and 106, a VRAM (Video RAM) which mainly comprises a semiconductor memory and in which the contents formed by the frame display unit 105 are written. The contents are output to the display 107. By extracting the contents of the VRAM 106, a frame can be captured. The display 107 comprises, for example, a liquid crystal display.

The frame transmission unit 108 serving as an output means extracts the image of the captured frame or the image compressed by the image compression unit 104 directly or through an image data recording unit 110, and outputs the image to a network interface 111 so as to transmit it to the client 300 through the network 200.

Reference numeral 109 denotes a command reception unit which receives a capture command transmitted from a client through the network 200, and transfers it to the control unit 102.

The image data recording unit 110 stores the image of the captured frame extracted from the VRAM 106, and mainly comprises a magnetic recording device such as a semiconductor memory or hard disk. The image data recording unit 110 may store the image compressed by the image compression unit 104. The captured image may also be distributed to the network 200 by the frame transmission unit 108 without being recorded on the image data recording unit 110.

The network interface 111 serves to connect to the network 200.

The arrangement of the client 300 will be described next.

A main memory 301 comprises, for example, a semiconductor memory. A control unit 302 includes a CPU 3021 and a program memory 3022 storing a program. The CPU 3021 performs overall control of the respective constituent elements in accordance with a control sequence based on the program stored in the program memory 3022.

Reference numeral 303 denotes an input unit comprising an input device such as a keyboard or mouse.

Reference numeral 304 denotes an image decompression unit which decompresses an image received through a frame reception unit 308 when the image is compressed; 305, a frame display unit which forms contents to be displayed on a display 307; and 306, a VRAM (Video RAM) which mainly comprises a semiconductor memory and in which the contents formed by the frame display unit 305 are written. The contents are output to the display 307. The display 307 comprises, for example, a CRT or liquid crystal display.

The frame reception unit 308 receives the image of the captured frame transmitted from the server through a network interface 311.

Reference numeral 309 denotes a command transmission unit which transmits/outputs a capture command to the server through the network interface 311.

Reference numeral 310 denotes an image data recording unit which stores the image of the frame received by the frame reception unit 308 or the image decompressed by the image decompression unit 304. The image data recording unit 310 mainly comprises a magnetic recording device such as a semiconductor memory or hard disk. The image of the received frame may be output to the frame display unit 305 without going through the image data recording unit 310 and displayed on the display 307 through the VRAM 306.

Figure 2:
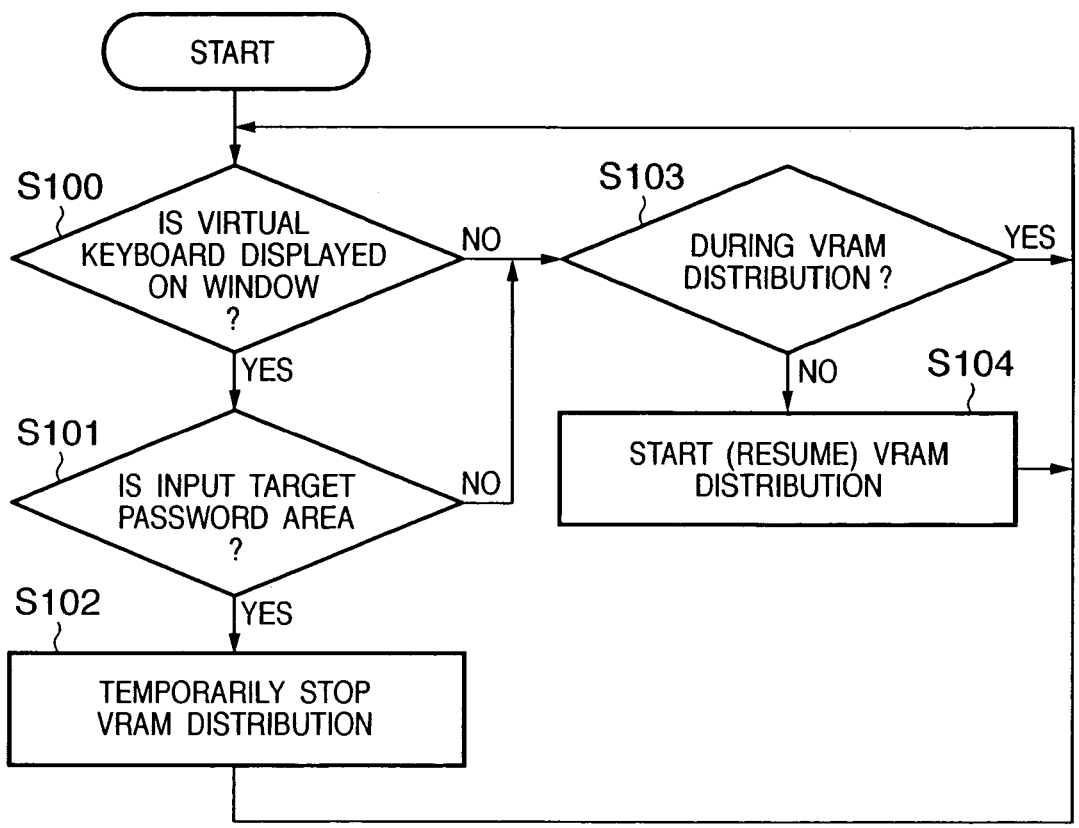
FIG. 2 is a flowchart showing control processing for VRAM distribution in the first embodiment.

FIG. 2 is a flowchart showing control processing for VRAM distribution in this embodiment. In this specification, "VRAM distribution" means the operation of capturing the contents of the VRAM and outputting them to an external device (e.g., the client 300) so as to transmit the image displayed on the display to the external device. In this embodiment, more specifically, VRAM distribution means the processing of making the command reception unit 109 receive a capture command from a client, capturing the contents of the VRAM 106 in accordance with an instruction from the control unit 102, and making the frame transmission unit 108 transmit the contents to the client after recording them on the image data recording unit 110 and making the image compression unit 104 compress them as needed. A program corresponding to this flowchart is stored in, for example, the program memory 1022 and executed by the CPU 1021.

First of all, in step S100, it is determined whether or not a virtual keyboard is displayed on the display 107. If the virtual keyboard is displayed, the flow advances to step S101 to determine whether or not a target character input window (input target) onto which characters are to be input by using the virtual keyboard is a password input window (password area). If this window is the password input window, the flow advances to step S102 to temporarily stop VRAM distribution. This stops the distribution of the image stored in the VRAM (i.e., the image displayed on the display) while the virtual keyboard is displayed on the display and the target character input window is the password input window.

If it is determined in step S100 that the virtual keyboard is not displayed on the display, or it is determined in step S101 that the target character input window is not the password input window, the flow advances to step S103 to determine whether or not VRAM distribution is currently performed. If VRAM distribution is currently performed, the flow returns to step S100 to repeat the processing. If VRAM distribution is not currently performed, the flow advances to step S104 to start (resume) VRAM distribution.

For the sake of security, the characters input onto the password input window are generally displayed upon being replaced by specific characters (e.g., "*") irrelevant to the input characters. Assume that a virtual keyboard is displayed during VRAM distribution and a password is input by using the virtual keyboard. In this case, even if the characters input onto the password input window are displayed upon being replaced by special characters, the selected virtual keys on the virtual keyboard are highlighted for a predetermined period of time (that is, the selected virtual keys are visually identified by, for example, displaying the selected virtual keys to appear dented or changing the color of the selected virtual keys.) Consequently, the password is known on the client side to which the image is distributed. According to control processing for VRAM distribution in this embodiment, since VRAM distribution is interrupted while a virtual keyboard is displayed on the display and a target character input window is the password input window, there is no chance that the password will be known on the client side.

In the first embodiment described above, a virtual keyboard is used as a virtual input device. However, a device other than this, e.g., an input device using a handwriting recognition technique, may be used. In this case, a set of lines before characters handwritten with a pen or the like are recognized are distributed without any change, the human can quickly recognize the set of lines as characters. It is very useful for security to stop VRAM distribution by the above control processing while characters are input onto the password input window by the handwriting recognition technique.

Second Embodiment

Figure 3:
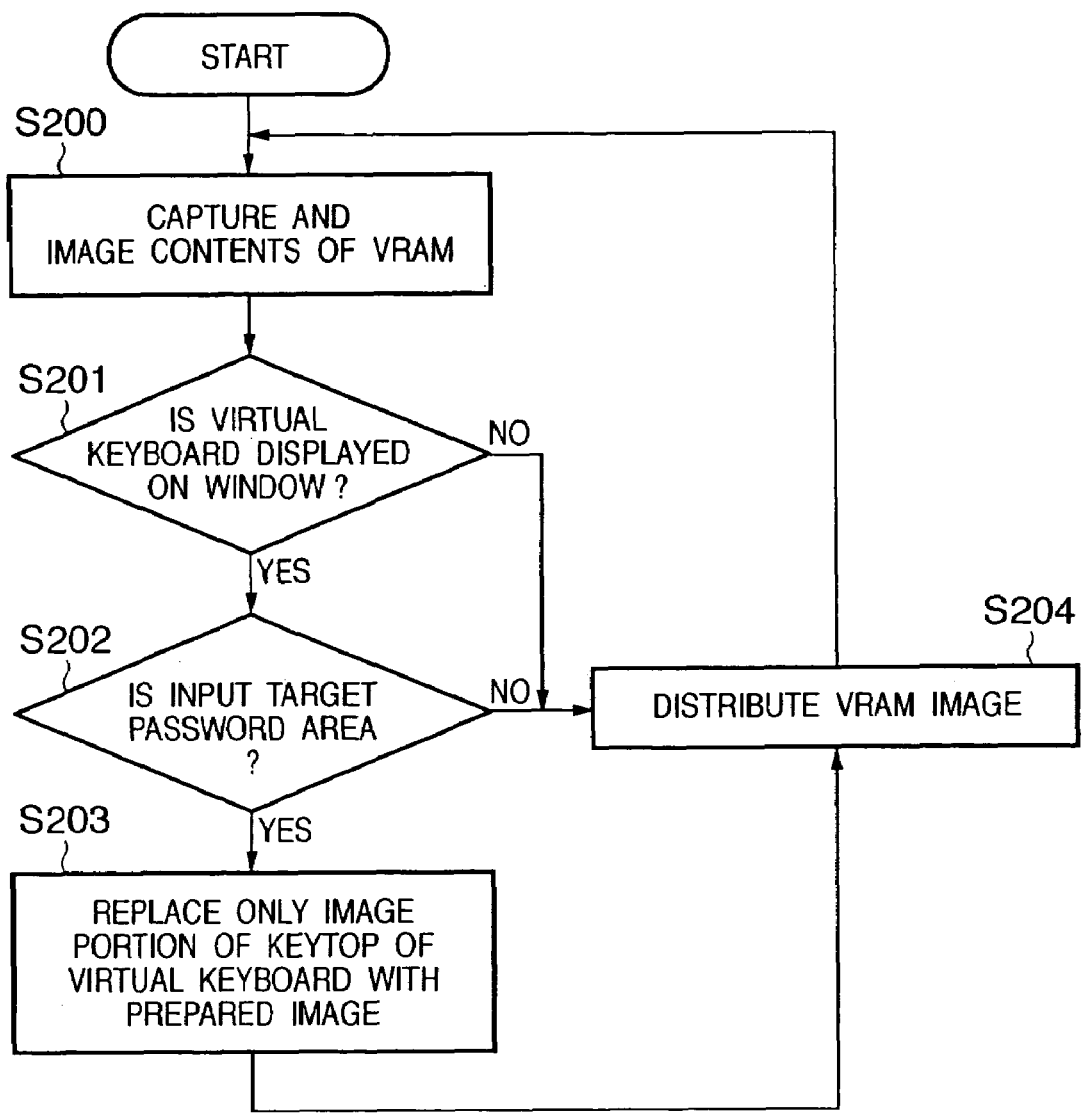
FIG. 3 is a flowchart showing control processing for VRAM distribution in the second embodiment.

Control processing for VRAM distribution in the first embodiment may be replaced by the processing shown in the flowchart of FIG. 3.

In step S200 in FIG. 3, the contents of a VRAM 106 are captured (frame capturing) and imaged. It is determined in step S201 whether or not a virtual keyboard is displayed on a display 107. If a virtual keyboard is displayed, the flow advances to step S202 to determine whether or not a target character input window (input target) onto which characters are input by using the virtual keyboard is a password input window (password area). If this window is the password input window, the flow advances to step S203 to insert a predetermined image prepared in advance in a keytop image of the virtual keyboard of the frame-captured image. In step S204, a VRAM image in which the predetermined image is inserted is distributed to a network. The flow then returns to step S200 to repeat the processing. If it is determined in step S201 that no virtual keyboard is displayed on the display or it is determined in step S202 that the target character input window is not the password input window, the flow advances to step S204 without performing the processing in step S203.

Figure 5A:
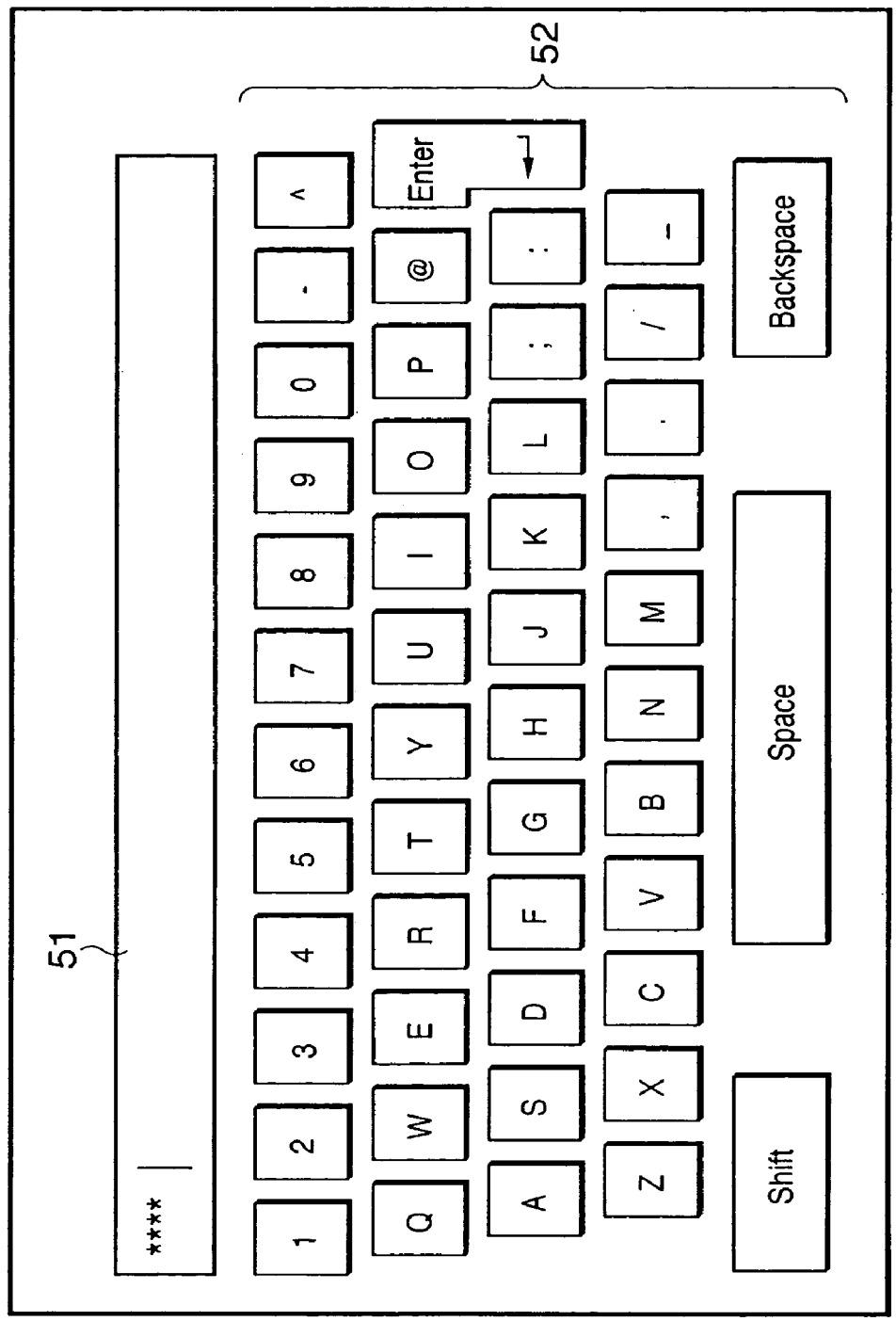
FIG. 5A is a view showing an example of an image including a password input window and virtual keyboard.
Figure 5B:
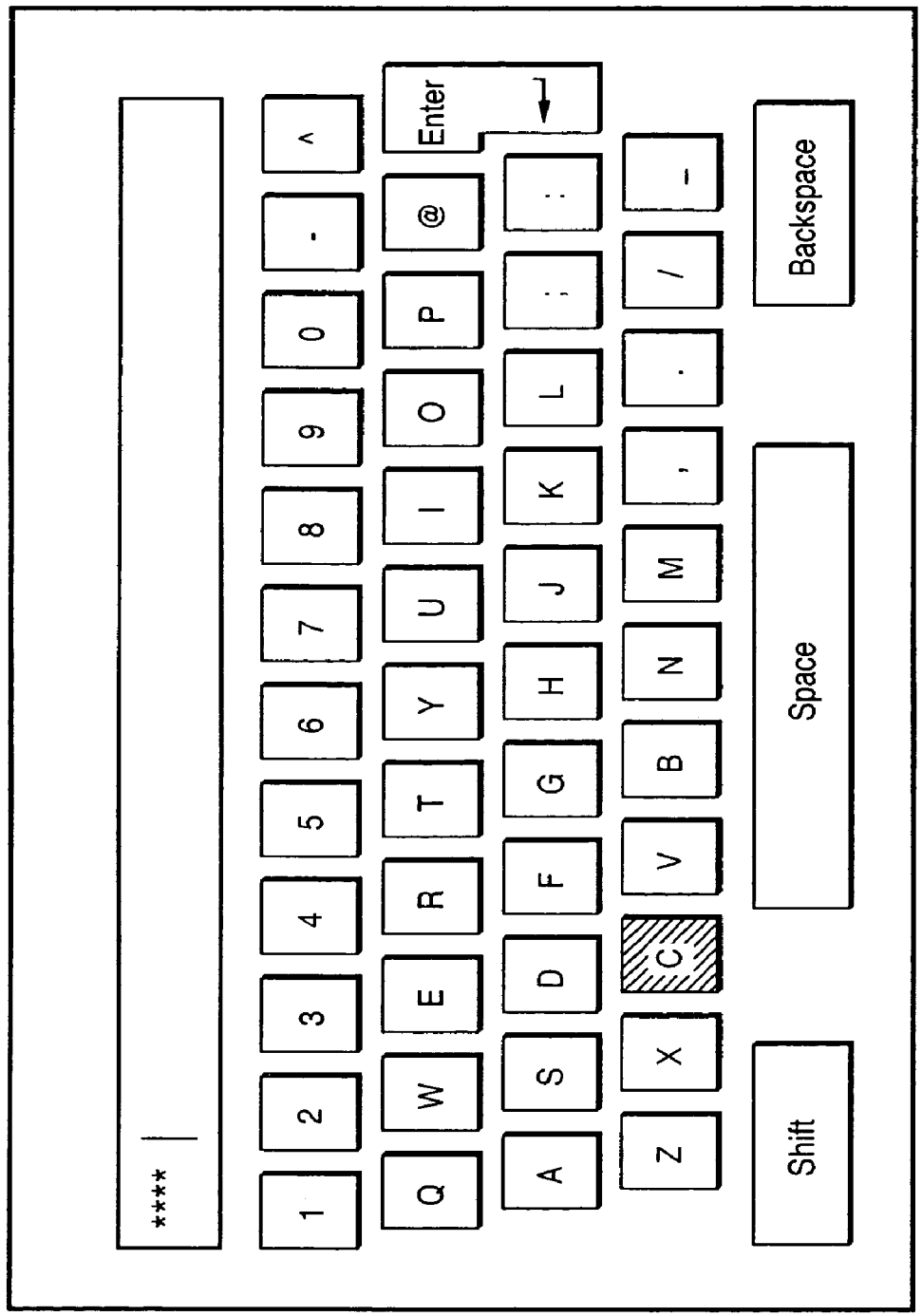
FIG. 5B is a view showing an example of a virtual keyboard whose specific virtual key is highlighted.
Figure 6:
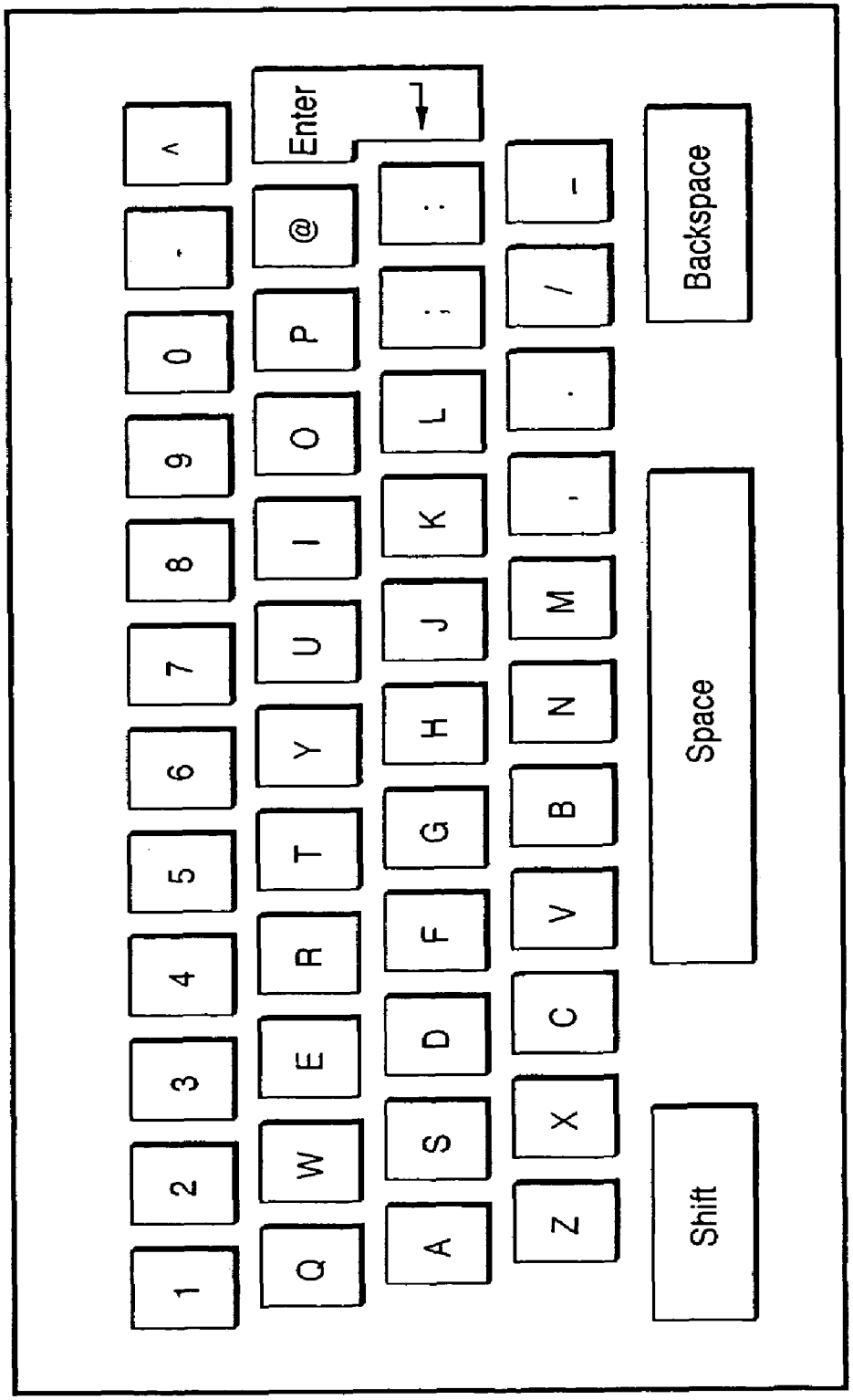
FIG. 6 is a view showing an example of a virtual keyboard in a state wherein no virtual key is highlighted.

FIG. 5A shows an example of an image displayed on the display. In this case, reference numeral 51 denotes a password input window; and 52, a virtual keyboard. FIG. 5B shows how a virtual key "C" is highlighted when the virtual key "C" is selected. If an image like that shown in FIG. 5B is captured and distributed without any change, it is known on the distribution destination that "C" is input. When an image portion of the keytop of the virtual keyboard like that shown in FIG. 6 is inserted so as to be properly superimposed on the image shown in FIG. 5B by the above method, the image shown in FIG. 5A can be obtained, and it cannot be known which key is pressed. Therefore, this image can be safely distributed to the network.

Third Embodiment

Figure 4:
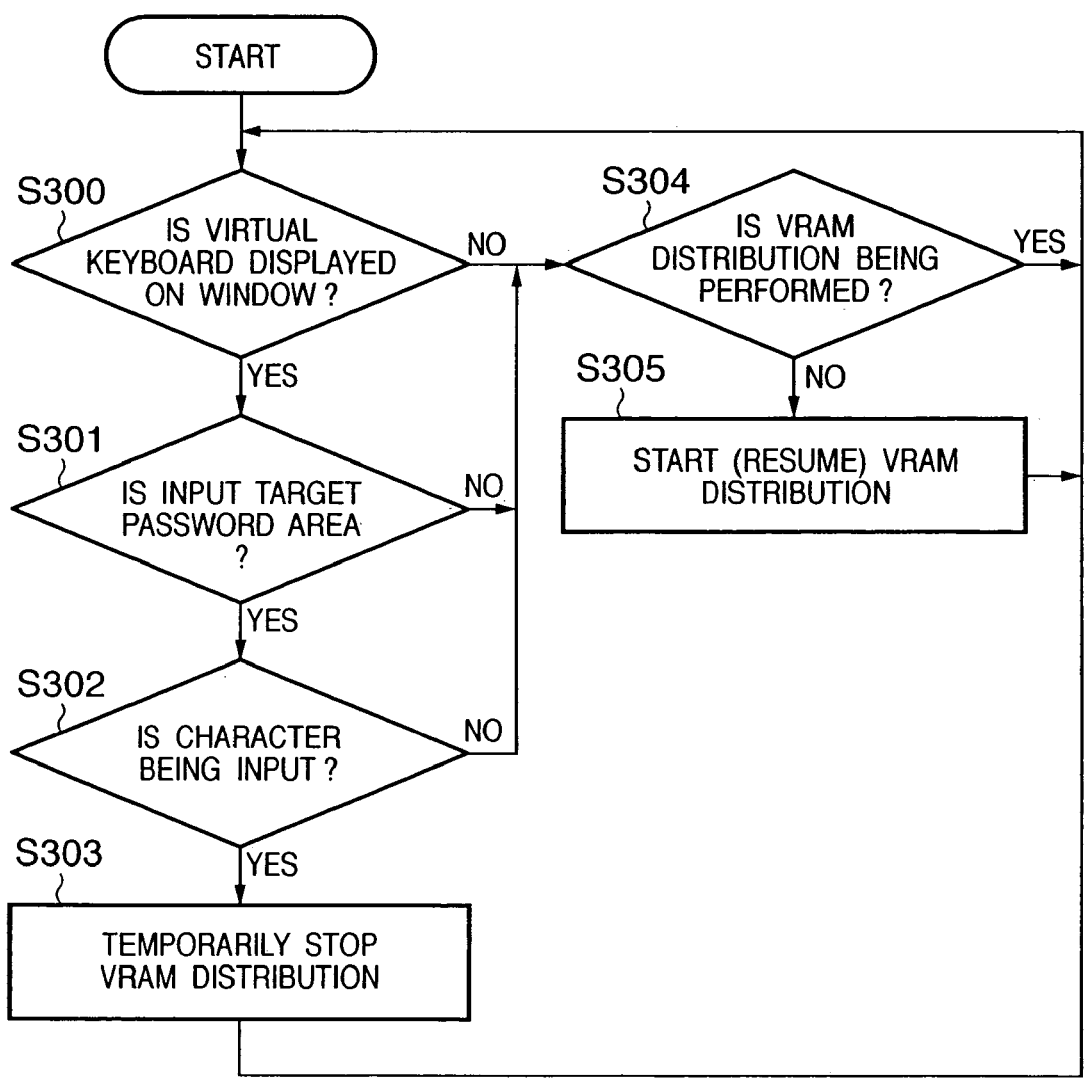
FIG. 4 is a flowchart showing control processing for VRAM distribution in the third embodiment.

Control processing for VRAM distribution in the first embodiment described above may be replaced by the processing shown in the flowchart of FIG. 4.

First of all, in step S300, it is determined whether or not a virtual keyboard is displayed on a display 107. If a virtual keyboard is displayed, the flow advances to step S301 to determine whether or not a target character input window (input target) on which characters are input by using the virtual keyboard is a password input window (password area). If this window is the password input window, the flow advances to step S302 to determine whether or not a character is currently input onto the password input window as the target character input window (which period corresponds, for example, an interval between the instant at which a button of the virtual keyboard is pressed and the instant at which the button is released). If a character is currently input on the password input window, the flow advances to step S303 to temporarily stop VRAM distribution. With this operation, the distribution of the image stored in the VRAM (i.e., the image displayed on the display) is stopped while characters are input onto the password input window through the virtual keyboard in a case wherein the virtual keyboard is display on the display and the target character input window is the password input window.

If it is determined in step S300 that no virtual keyboard is displayed on the display or it is determined in step S301 that the target character input window is not the password input window or it is determined in step S302 that no character is currently input onto the password input window, the flow advances to step S304 to determine whether or not VRAM distribution is currently performed. If VRAM distribution is currently performed, the flow returns to step S300 to repeat the processing. If no VRAM distribution is currently performed, the flow advances to step S305 to start (resume) VRAM distribution.

According to the above control processing, even if a target character input window onto which characters are input by using a virtual keyboard is the password input window, no input button is highlighted on the virtual keyboard unless a character is being input to the password input window. In this case, the VRAM image can be safely sent to the network.

Consider Java (trademark), for example. When an area "TextField" in which characters can be input is to be used as a password input window, a character (to be referred to as an echo character hereinafter) ("*" in general) for masking arguments is designated by a method called setEchoChar. With this setting, the user's input is not directly displayed in TextField but is displayed in echo character. In addition, making inquiry as to whether an echo character is set in TestField by a method called echoCharIsSet makes it possible to acquire information indicating whether or not the target window is the password input window (the process in step S301 shown in FIG. 4).

Fourth Embodiment

Figure 7:
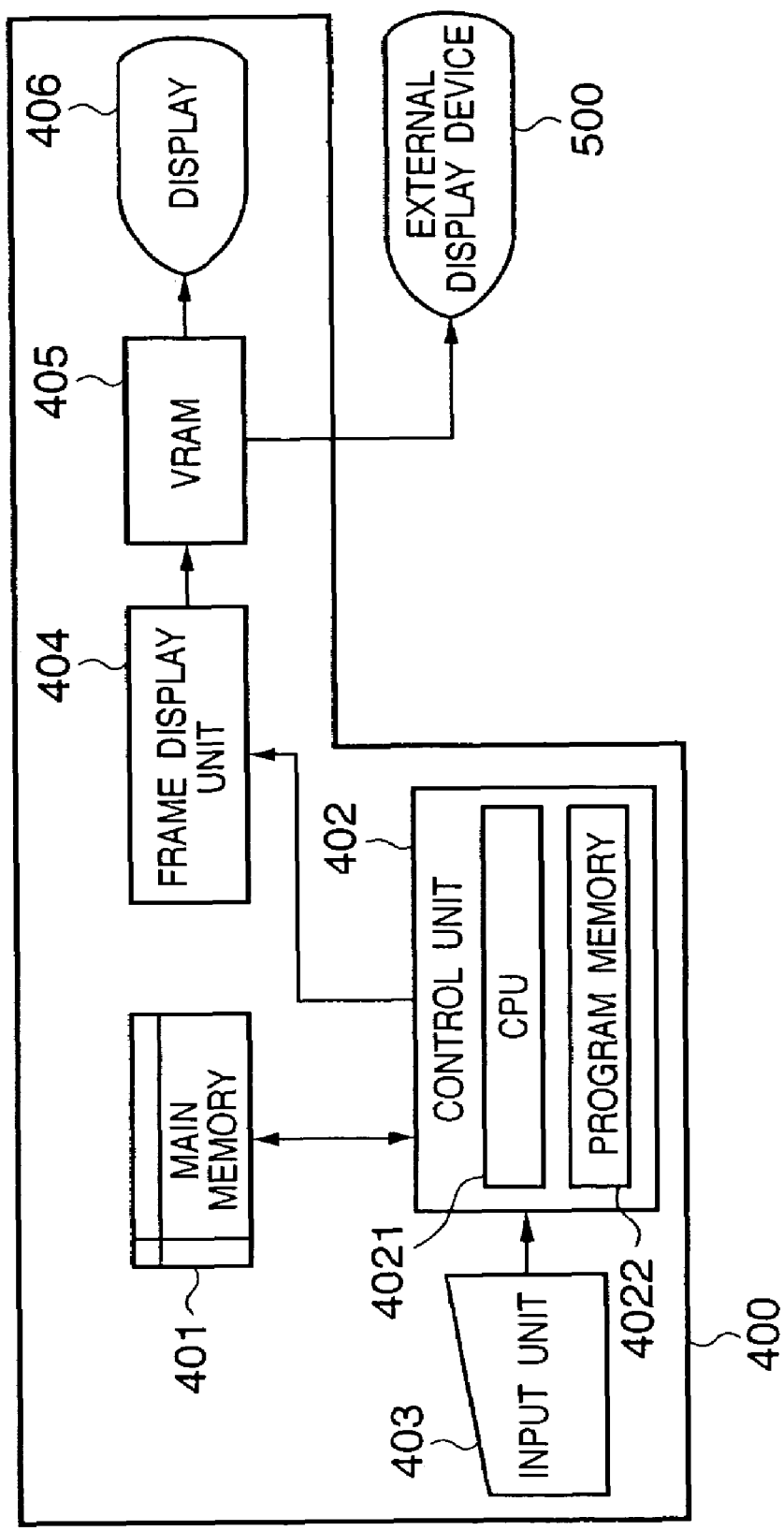
FIG. 7 is a block diagram showing the arrangement of an information processing apparatus according to the fourth embodiment.

FIG. 7 is a block diagram showing an example of the arrangement of an information processing apparatus according to this embodiment.

In an information processing apparatus 400, a main memory 401 comprises, for example, a semiconductor memory. A control unit 402 includes a CPU 4021 and a program memory 4022 in which a program is stored. The CPU 4021 performs overall control of respective constituent elements in accordance with a control sequence based on the program stored in the program memory 4022.

Reference numeral 403 denotes an input unit which may operate on the assumption of input from an input device such as a keyboard or mouse, but operates, in particular in this embodiment, on the assumption of touch input from a virtual keyboard as a virtual input device appearing on the liquid crystal display with a touch panel which is integrated with an output unit.

Reference numeral 404 denotes a frame display unit which forms contents to be displayed on a display 406; and 405, a VRAM (Video RAM) which mainly comprises a semiconductor memory and in which the contents formed by the frame display unit 404 are written. The contents are output to the display 406. The display 406 comprises, for example, a liquid crystal display.

An outline of the arrangement of the information processing apparatus 400 in this embodiment has been described above. As shown in FIG. 7, an external display device 500 is connected to the information processing apparatus 400. The external display device 500 comprises, for example, a liquid crystal projector or CRT. When the external display device 500 is connected to the VRAM 405, the same window as that displayed on the display 406 is output (mirroring) to the external display device 500. However, different contents may be displayed on the external display device 500. In this case, a VRAM dedicated to the external display device may be provided independently of the VRAM 405.

As a typical example of the above arrangement, for example, the information processing apparatus 400 is assumed to be a device such as a PDA which has no external keyboard and is designed to make a user operate a liquid crystal touch panel with a finger or pen and has an external output. If this device is connected to a projector device as the external display device 500 through the external output, when a presentation is made, the operator can operate the PDA while seeing a window on the PDA (i.e., the display 406), and people who see the presentation can see an enlarged window displayed on the projector (i.e., the external display device 500). In this case, the same window as that of the PDA is displayed on the projector by mirroring.

Figure 8:
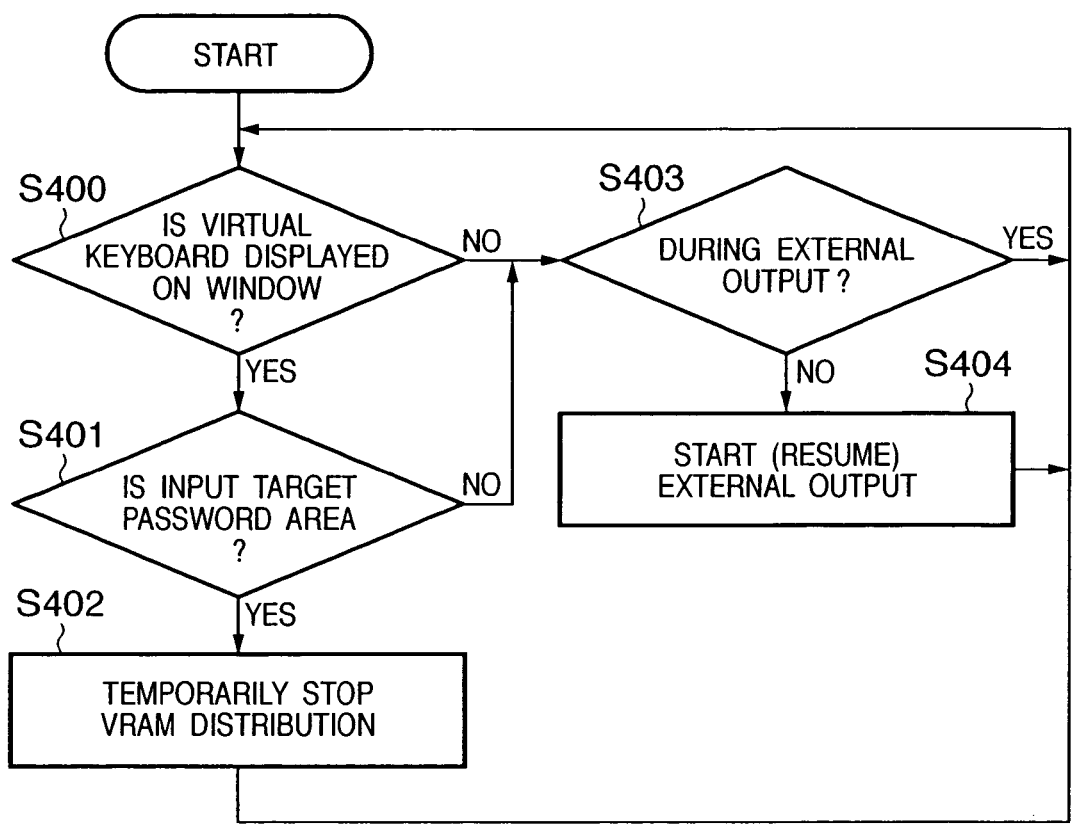
FIG. 8 is a flowchart showing control processing for image output to an external display device in the fourth embodiment.

FIG. 8 is a flowchart showing control processing for image output operation to the external display device 500 in this embodiment.

First of all, in step S400, it is determined whether or not a virtual keyboard is displayed on the display 406. If a virtual keyboard is displayed, the flow advances to step S401 to determine whether or not the target character input window (input target) onto which characters are input by using the virtual keyboard is a password input window (password area). If this window is the password input window, the flow advances to step S402 to temporarily stop output (external output) to the external display device 500. With this operation, the output of the image stored in the VRAM 405 (i.e., the image displayed on the display 406) to the external display device 500 is stopped while the virtual keyboard is displayed on the display 406 and the target character input window is the password input window.

If it is determined in step S400 that no virtual keyboard is displayed on the display 406, or it is determined in step S401 that the target character input window is not the password input window, the flow advances to step S403 to determine whether external output is currently performed. If external output is currently performed, the flow returns to step S400 to repeat the processing. If external output is not currently performed, the flow advances to step S404 to start (resume) the external output.

For the sake of security, the characters input on the password input window are generally displayed upon being replaced by specific characters (e.g., "*") irrelevant to the input characters. Assume that a virtual keyboard is displayed on a window on the external display device 500 during external output operation and a password is input by using the virtual keyboard. In this case, even if the characters input on the password input window are displayed upon being replaced by special characters, the selected virtual keys on the virtual keyboard are highlighted for a predetermined period of time (in general, the selected keys look dented). Consequently, the password is known by the image displayed on the external display device 500. According to control processing for external output operation in this embodiment, since external output is interrupted while a virtual keyboard is displayed on the display 406 and a target character input window is the password input window, there is no chance that the password will be known from the image displayed on the external display device 500.

Fifth Embodiment

Figure 9:
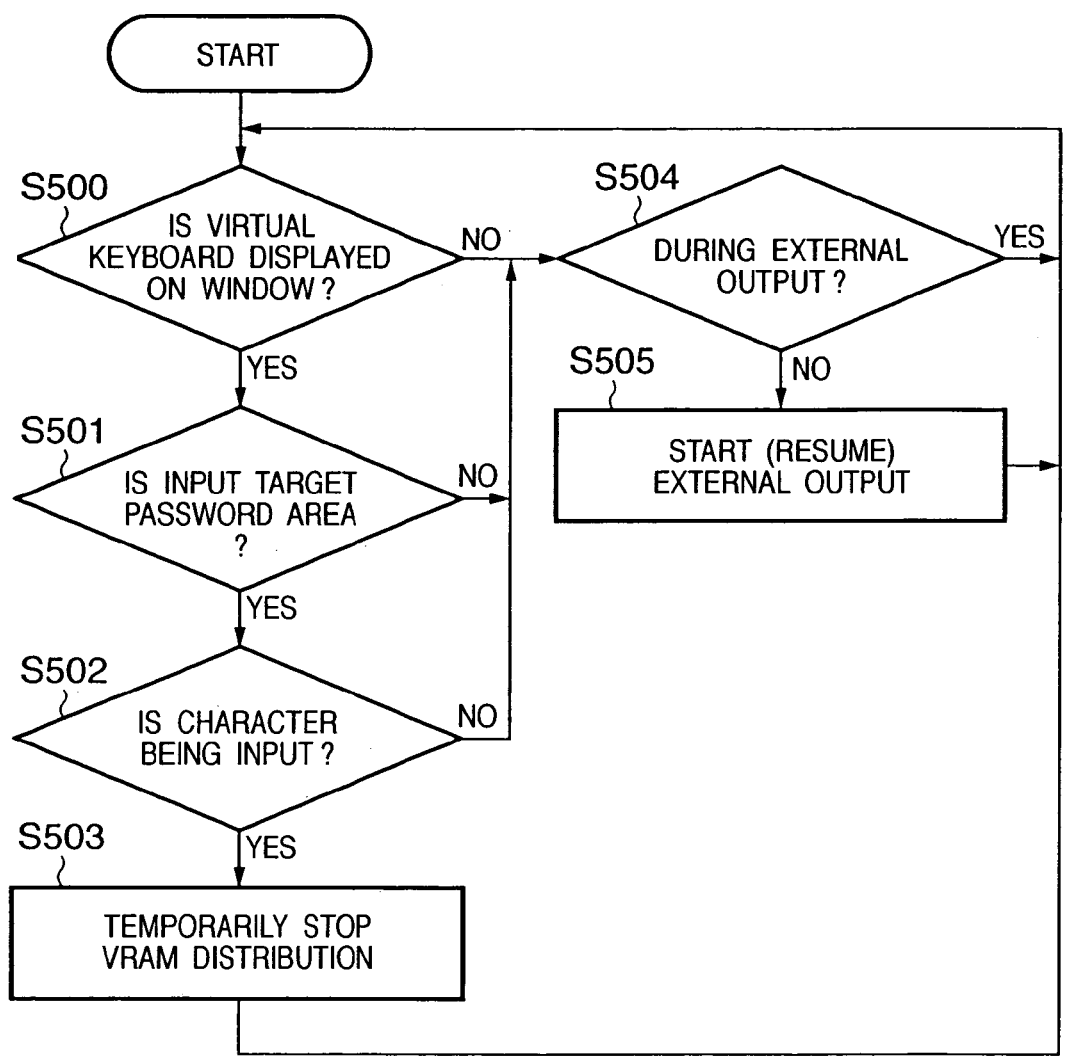
FIG. 9 is a flowchart showing control processing for image output to an external display device in the fifth embodiment.

Control processing for external output operation in the fourth embodiment may be replaced by the processing shown in the flowchart of FIG. 9.

First of all, in step S500, it is determined whether or not a virtual keyboard is displayed on a display 406. If a virtual keyboard is displayed, the flow advances to step S501 to determine whether or not a target character input window (input target) onto which characters are input by using the virtual keyboard is a password input window (password area). If this window is the password input window, the flow advances to step S502 to determine whether or not a character is currently input onto the password input window as the target character input window (which period corresponds to, for example, an interval between the instant at which a button of the virtual keyboard is pressed and the instant at which the button is released). If a character is currently input onto the password input window, the flow advances to step S503 to temporarily stop image output (external output) to an external display device 500. With this operation, output of the image stored in a VRAM 405 (i.e., the image displayed on the display 406) to the external display device 500 is stopped while characters are input onto the password input window through the virtual keyboard in a case wherein the virtual keyboard is display on the display 406 and the target character input window is the password input window.

If it is determined in step S500 that no virtual keyboard is displayed on the display 406, or it is determined in step S501 that the target character input window is not the password input window, or it is determined in step S502 that no character is currently input onto the password input window, the flow advances to step S504 to determine whether or not external output operation is currently performed. If external output operation is currently performed, the flow returns to step S500 to repeat the processing. If external output operation is not currently performed, the flow advances to step S505 to start (resume) the external output operation.

According to the above control processing, even if a target character input window onto which characters are input by using a virtual keyboard is the password input window, no input button of the virtual keyboard is highlighted unless a character is currently input onto the password input window. Therefore, an image can be safely output to the external display device 500.

Sixth Embodiment

Figure 10:
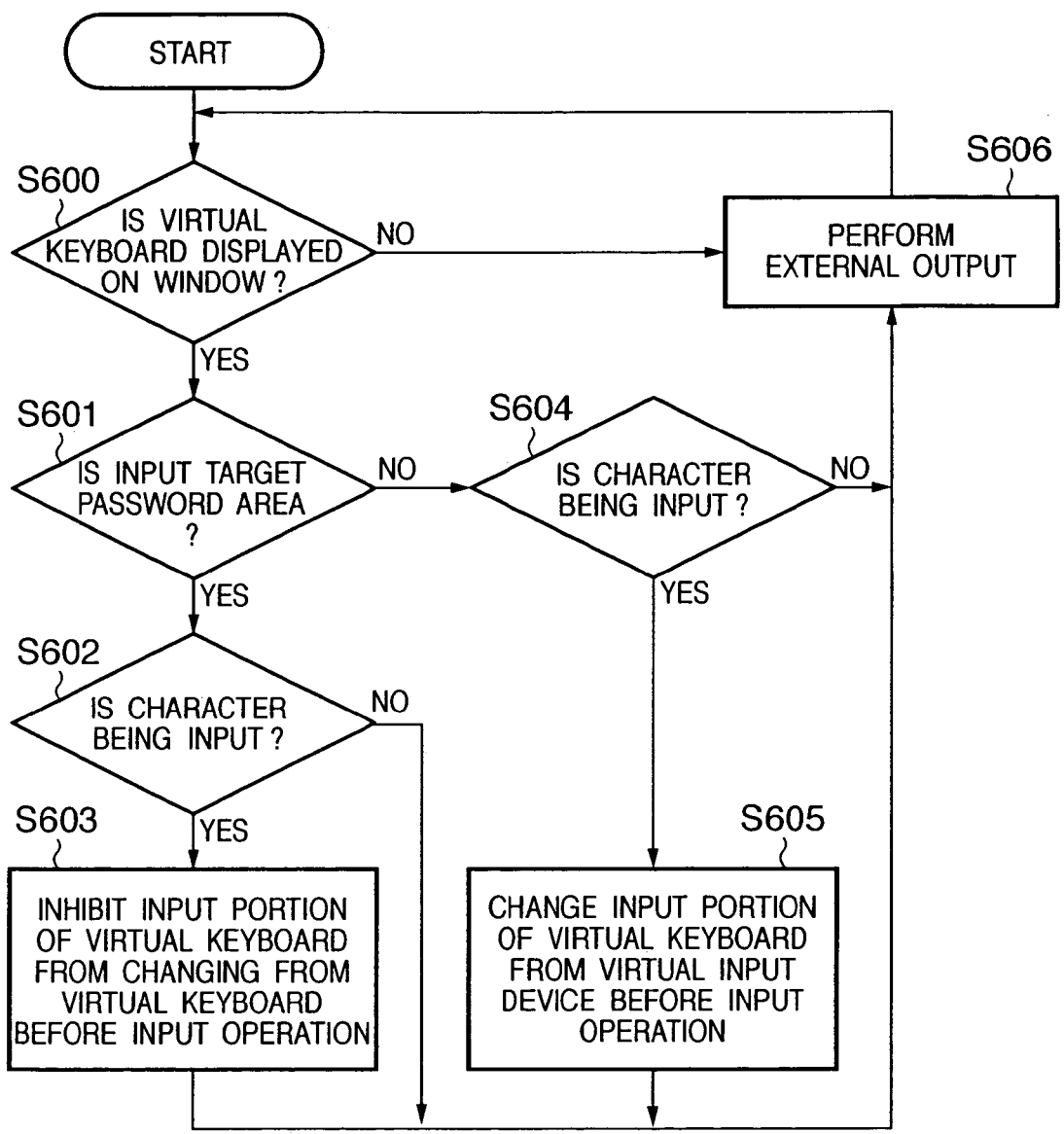
FIG. 10 is a flowchart showing control processing for image output to an external display device in the sixth embodiment.

Control processing for external output operation in the fourth embodiment described above may be replaced by the processing shown in the flowchart of FIG. 10.

First of all, in step S600, it is determined whether or not a virtual keyboard is displayed on a display 406. If a virtual keyboard is displayed, the flow advances to step S601 to determine whether or not the target character window (input target) onto which characters are input by using the virtual keyboard is a password input window (password area). If this window is the password input window, the flow advances to step S602 to determine whether or not a character is currently input onto the password input window as the target character input window (which period corresponds to, for example, an interval between the instant at which a button of the virtual keyboard is pressed and the instant at which the button is released). If a character is currently input onto the password input window, the flow advances to step S603 to inhibit the input portion of the virtual keyboard from changing from that of the virtual keyboard before the input operation. That is, the flow advances to step S606 to perform external output operation without performing the processing of highlighting the selected virtual key on the virtual keyboard for a predetermined period of time (in general, making the selected key look dented). With this operation, in a case wherein a virtual keyboard is displayed on the display and the target character input window is the password input window, while a character is being input onto the password input window through the virtual keyboard, the display form of the portion of the virtual keyboard displayed on an external display device 500 does not change even if a password is input on an information processing apparatus 400 by using a virtual keyboard.

If it is determined in step S601 that the target character input window is not the password input window, the flow advances to step S604 to determine whether or not a character is currently input onto the password input window as the target character input window. If a character is currently input onto the password input window, the flow advances to step S605 to change the input portion of the virtual keyboard from the state of the virtual keyboard before the input operation. That is, the processing of highlighting the selected virtual key on the virtual keyboard for a predetermined period of time is executed, and the flow advances to step S606 to perform external output operation.

If it is determined in step S600 that no virtual keyboard is displayed on the display 406, or it is determined in step S602 that no character is currently input onto the password input window, the flow advances to step S606 to continue external output operation as in a normal case.

With the above control processing, when a character is input onto the password input window by using the virtual keyboard, since the display form of the virtual keyboard does not change from that before the input operation, no person can see, on the display window of the external display device 500, how input operation is performed. This makes it possible to safely output a frame to the outside.

Seventh Embodiment

Figure 11:
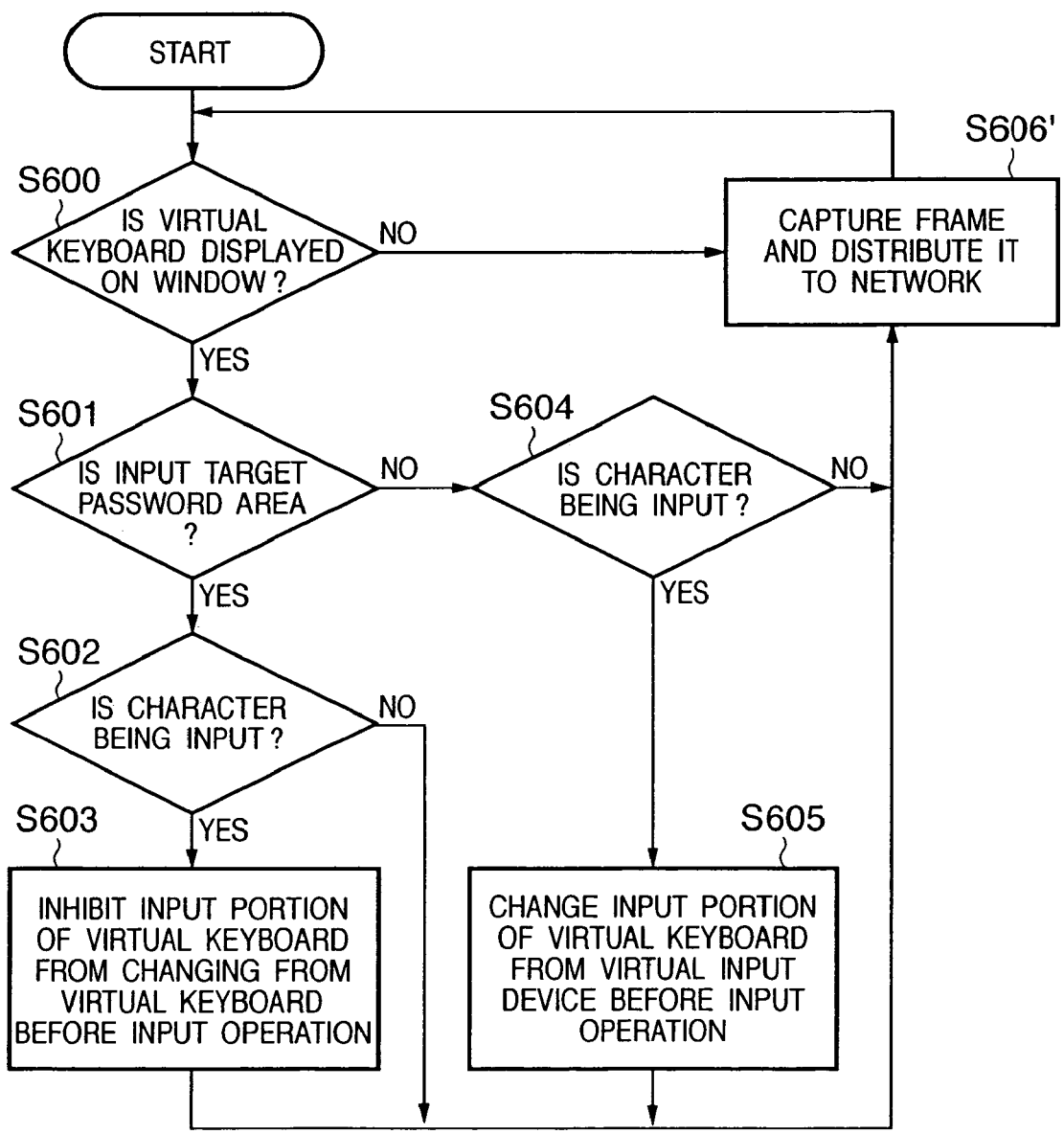
FIG. 11 is a flowchart showing control processing for VRAM distribution in the seventh embodiment.

The control processing for external output operation in the sixth embodiment described above can also be applied to the control processing for VRAM distribution in the first embodiment. FIG. 11 is a flowchart showing control processing for VRAM distribution in this embodiment. This flowchart is almost the same as that shown in FIG. 10, and the same processing steps are assigned the same step numbers. The processing in this embodiment differs from that in the first embodiment in that step S606 of outputting an image to an external display device 500 is replaced by step S606' of capturing a frame and distributing it to a network.

With the above control processing, while a character is input onto the password input window by using the virtual keyboard, the display form of the virtual keyboard does not change from that before the input operation, and hence it is impossible to see on the client side how input operation is performed. This makes it possible to safely distribute the contents of a frame to a network.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-093164 filed on Mar. 26, 2004, the entire contents of which are hereby incorporated by reference herein.

What is claimed is:
1. An information processing apparatus comprising:
character input means for displaying a virtual input device on a display and inputting a character corresponding to operation on the virtual input device onto a target character input window;

determination means for determining whether or not the virtual input device is displayed on the display and the target character input window is a password input window; and output means for outputting an image displayed on the display to an external device if said determination means determines that the virtual input device is not displayed on the display or the target character input window is not the password input window, and stopping outputting an image displayed on the display to the external device if said determination means determines that the virtual input device is displayed on the display and the target character input window is the password input window.

2. An information processing method comprising:

a character input step of displaying a virtual input device on a display and inputting a character corresponding to operation on the virtual input device onto a target character input window; and determination means for determining whether or not the virtual input device is displayed on the display and the target character input window is a password input window; and an output step of outputting an image displayed on the display to an external device if said determination means determines that the virtual input device is not displayed on the display or the target character input window is not the password input window, and stopping outputting an image displayed on the display to the external device if said determination means determines that the virtual input device is displayed on the display and the target character input window is the password input window.

3. A computer-readable storage medium storing a program for executing an information processing method defined in claim 2.

* * * * *